United States Patent
Zhao

(10) Patent No.: US 6,463,303 B1
(45) Date of Patent: Oct. 8, 2002

(54) BEAM FORMING AND SWITCHING ARCHITECTURE

(75) Inventor: Aiguo Zhao, Bothell, WA (US)

(73) Assignee: Metawave Communications Corporation, Redmond, WA (US)

(*) Notice: Subject to any disclaimer, the term of this patent is extended or adjusted under 35 U.S.C. 154(b) by 0 days.

(21) Appl. No.: 09/481,466

(22) Filed: Jan. 11, 2000

(51) Int. Cl.[7] .................................................. H04B 1/38
(52) U.S. Cl. ........................ 455/562; 455/272; 455/129; 342/354; 342/368
(58) Field of Search ............................ 455/403, 561, 455/562, 129, 272, 276.1; 342/354, 368

(56) References Cited

U.S. PATENT DOCUMENTS 5,274,844 A * 12/1993 Harrison et al. ......... 455/276.1
6,094,165 A * 7/2000 Smith ........................ 455/422
6,101,399 A * 8/2000 Raleigh et al. ............. 455/561

* cited by examiner

Primary Examiner—Doris H. To
(74) Attorney, Agent, or Firm—Fulbright & Jaworski L.L.P.

(57) ABSTRACT

Disclosed is a system and method providing beam forming and selection to provide desired signals to/from signal processing devices such as cell site modems. Systems of the present invention are operable with multi-beam antenna arrays to utilize antenna beams provided by the multi-beam antenna array and to form antenna beams which supplement the antenna beams formed by the multi-beam antenna array. Additionally, systems of the present invention are operable with adaptive array antennas to form antenna beams having desired characteristics. Preferably, predefined sets of beam forming weighting characteristics are utilized to provide a hybrid adaptive beam forming technique wherein antenna beams having predetermined characteristics may be rapidly selected and formed. Additionally, dynamically determined sets of beam forming weighting characteristics may be utilized to provide additional antenna beams having other desired characteristics.

51 Claims, 3 Drawing Sheets

BEAM FORMING AND SWITCHING ARCHITECTURE

RELATED APPLICATIONS

Reference is hereby made to co-pending and commonly assigned U.S. patent application Ser. No. 08/924,741, entitled "Embedded Digital Beam Switching," the disclosure of which application is hereby incorporated herein by reference.

TECHNICAL FIELD OF THE INVENTION

This invention relates in general to beam forming architecture, and more specifically to systems and methods for providing controlled selection of areas in which particular signals are transmitted and/or received using either a multiple fixed beam array or an adaptive array.

BACKGROUND

In a spread spectrum CDMA system, multiple communication units, or mobile systems, operate on a single frequency separated only by a particular CDMA code and/or a CDMA code delay defining a CDMA channel. Typically these CDMA channels are available throughout a cell, or sector of the cell. However, radiation of a CDMA channel within an area of the cell in which the particular communication unit assigned to the CDMA channel is not operating only serves to increase the interference energy experienced by other communication units operating on that frequency.

In order to provide separate communications over a same frequency, a CDMA system must be able to despread and separate the transmitted and received signals that are using different codes or different code delays. Accordingly, CDMA communications are interference limited. If radiation of a particular CDMA channel could be restricted to only within an area most likely to actually be utilized by a communication unit assigned to the CDMA channel, communication capacity may be increased. In order to isolate transmission of a CDMA channel to a particular area within the cell, a multi-beam or adaptive array antenna system is preferably utilized.

Accordingly, there exists a need in the art for a system and method for equipping a CDMA or other base station to dynamically restrict communication with communication units to selected areas to reduce interference. For example, a multiple fixed beam antenna, such as provides substantially non-overlapping antenna beams illuminating a service area, may be switchably connected to transceiver apparatus in order to allow transmission and reception of a CDMA signal within a particular area and transmission and reception of another CDMA signal within another particular area.

However, the use of such switched beam systems sometimes presents a disadvantage in that a cusping point exists between ones of the antenna beams. Such a cusping point provides an area of signal gain reduction or loss. Where this cusping loss is significant, such as on the order of 3 dB gain difference between the cusping point and the center of the beam, communication quality may degrade as a mobile subscriber unit moves from an area near the center of one fixed antenna beam toward the area near the center of another fixed antenna beam, thereby traversing a cusping area there between.

The effects of these cusping loses may be decreased by providing additional fixed beams to thereby provide antenna beam centers which are located more closely together. However, such a solution generally requires prohibitive costs in that the antenna array must be changed and a more complex beam forming matrix must be provided in addition to providing additional circuitry to accommodate the additional number of signals transmitted or received from the added antenna beams.

Adaptive arrays, providing steerable antenna beams which may be controlled to individually point at a current mobile position, may be utilized in avoiding the above described cusping losses and/or other disadvantages associated with fixed antenna beams. Additionally, adaptive beam forming techniques may be utilized not only to provide an antenna beam which best serves the subscriber unit of interest, but such beams may also be formed to reduce interference to/from other units. For example, nulls may be steered in the antenna beam where a source of interference is located in order to avoid or mitigate interference in communications with a subscriber unit of interest.

However, the use of adaptive array antennas generally require the real time determination of complex weighting information and its application to a plurality of signal components used in forming the antenna beam. Such weighting information determination and application generally requires substantial processing resources to provide real time antenna beam steering and can result in signal processing delays or other undesired consequences.

Accordingly, a need in the art exists for a system and method adapted to control the transmission and/or reception of signals to reduce the interference level within a service area wile avoiding cusping losses and/or the need for intensive processing capability in beam forming.

A further need exists in the art for a system and method adapted to operate with a multiple beam array, an adaptive array, or a combination thereof.

SUMMARY OF THE INVENTION

These and other objects, features and advantages are achieved in a system and method utilizing a beam forming architecture adapted for both adaptively forming antenna beams having desired attributes as well as selectively switching between antenna beam signals of predetermined antenna beams. Accordingly, utilizing a multi-beam antenna array and a hybrid beam switching and adaptive beam forming technique, the present invention allows for the selection of particular fixed beams suitable for providing the desired communications and the formation of additional antenna beams to redress undesired communications attributes associated therewith, such as cusping losses. Likewise, utilizing an antenna array adapted for adaptive beam forming and a hybrid selectable adaptive beam forming technique, wherein complex signal weighting information associated with various adaptively formed beams are predetermined, disadvantages associated with the computational resource requirements and/or signal processing delays of typical adaptive array systems are redressed.

A preferred embodiment of the present invention operates to take the inputs from a multi-beam antenna, such as a twelve beam antenna system, and switch ones of those beams so that the best beams, the preferred embodiment switching six such beams, are routed into the cell site demodulator. Where the signal quality or other communication attribute associated with the antenna beams provided by the antenna array is undesirable, the present invention preferably utilizes ones of the antenna beam signals to adaptively, i.e., applying adaptive beam forming weighting and combining such as linear coherent complex combining, form antenna beam signals having an improved communication attribute. For example, where a subscriber mobile unit is disposed at a cusping point between two of the antenna beams provided by the multi-beam antenna, the present invention may operate to form an antenna beam substantially centered at this cusping point to provide better communication attributes.

A preferred embodiment of the present invention operates to take the inputs from an antenna array having antenna elements disposed in a configuration suitable for antenna beam forming, such as a twelve antenna element column antenna system, and form desired antenna beams therefrom, switching ones of, or otherwise providing, those beams so that the best beams, the preferred embodiment switching six such beams, are routed into the cell site demodulator. Preferably, to reduce the burden on processing resources required to provide beam forming, various predetermined sets of signal component weighting information are utilized which correspond to antenna beams commonly used. Where the signal quality or other communication attribute associated with the antenna beams provided by the antenna array, the present invention preferably adaptively forms antenna beam signals having an improved communication attribute in addition to the predetermined sets of weighting information.

According to a most preferred embodiment of the present invention, a multifarious beam forming architecture is adapted for use with either a fixed antenna beam array, an adaptive array, or a combination thereof. Accordingly, a common architecture may be utilized in both the multi-beam antenna and adaptive antenna array embodiments described above by providing information with respect to the signals provided by a coupled antenna to allow for proper beam forming according to the present invention. Moreover, by coupling the inventive architecture to both a beam forming matrix of a multi-beam antenna array and the antenna elements associated therewith, the architecture may be utilized in providing a combination of the above described embodiments. For example, beam switching supplemented by adaptive beam forming using a multi-beam array may be performed on the reverse link while adaptive beam forming utilizing predetermined sets of weighting parameters using an adaptive array antenna may be performed on the forward link.

A technical advantage of the present invention is provided in that disadvantages associated with the use of a fixed beam array are addressed utilizing a hybrid beam switching technique including beam adaptive forming capabilities to provide antenna beams having desired attributes to supplement those associated with the fixed beam array.

A further technical advantage of the present invention is provided in that disadvantages associated with the use of an adaptive array are addressed utilizing a hybrid adaptive beam forming technique with predefined beam switching or selection capabilities to ease the burden of fully adaptively forming all desired antenna beams.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The preferred embodiment of the present invention provides a beam forming/switching architecture suitable for use with an antenna system having a plurality of antenna signals associated therewith. Accordingly, the circuitry of the present invention may operate to accept signals from the antenna array and both adaptively form antenna beams having desired characteristics and selectively switch or select between antenna beam signals associated with predefined antenna beams determined to provide desired attributes.

Figure 1A:
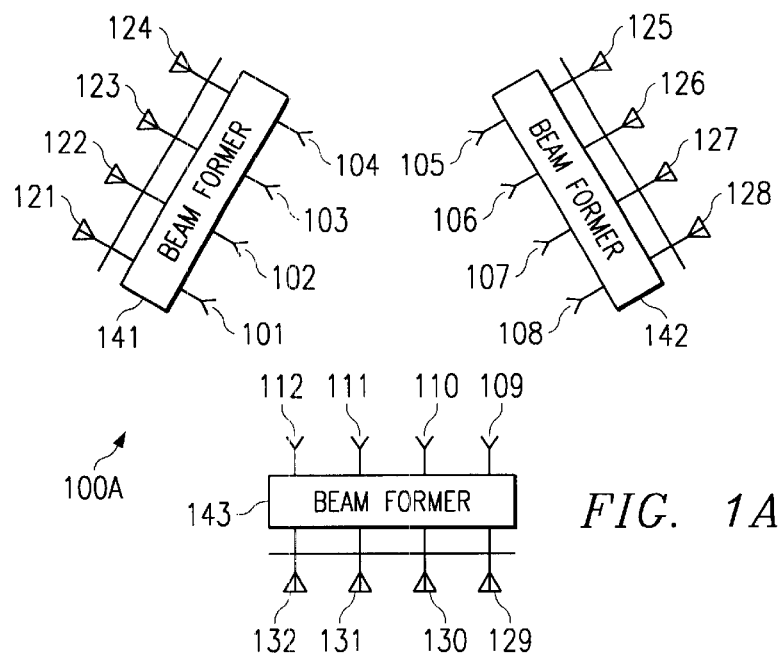
FIGS. 1A and 1B show antenna arrays operable with the present invention.

One antenna system suitable for use according to the present invention is shown in FIG. 1A as multi-beam antenna array 100A. Antenna array 100A includes antenna elements 121–132, which may each be a single signal transducer or antenna columns or other arrangements of a plurality of signal transducers, disposed in an orientation suitable for beam forming. Specifically, in the embodiment of FIG. 1A, antenna elements 121–124 are disposed in a configuration providing a first multi-beam antenna panel, antenna elements 125–128 are disposed in a configuration providing a second multi-beam antenna panel, and antenna elements 129–132 are disposed in a configuration providing a third multi-beam antenna panel.

Also in the embodiment of FIG. 1A, each antenna panel has a beam forming matrix, matrixes 141–143, coupled thereto. These beam forming matrixes may be any beam former known in the art, such as a Butler matrix, suitable for providing desired antenna beam characteristics. In the preferred embodiment shown in FIG. 1A, each beam forming matrix is coupled to the antenna elements of an associated panel and provides four antenna signal interfaces thereto. Specifically, beam forming matrix 141 is coupled to antenna elements 121–124 and provides antenna signal interfaces 101–104, beam forming matrix 142 is coupled to antenna elements 125–128 and provides antenna signal interfaces 105–108, and beam forming matrix 143 is coupled to antenna elements 129–132 and provides antenna signal interfaces 109–112.

It should be appreciated that the signals at each of interfaces 101–112 of antenna array 100A are associated with a predefined antenna beam. For example, where beam forming matrixes 141–143 are Butler matrixes, each antenna panel of FIG. 1A may have four 30° substantially non-overlapping antenna beams associated therewith, where each interface corresponds to one of these antenna beams.

Accordingly, utilizing antenna array 100A, a signal may be selectively radiated in, or received from, selected areas in a 360° area about antenna array 100A by properly selecting an interface of antenna beam signal interfaces 101–112 to couple to a transmitter or receiver. However, particular situations may present themselves where selection of any one of the available antenna beams provides a signal having an undesired communication attribute, such as where a subscriber unit is disposed at a cusping point between two of the antenna beams.

Figure 1B:
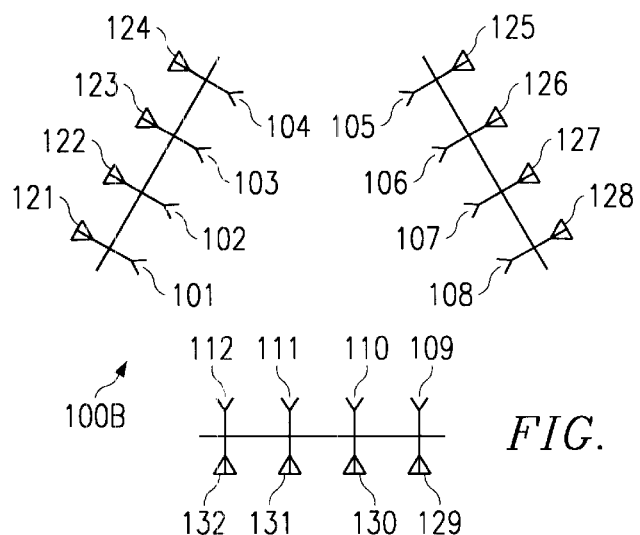

Another antenna system suitable for use according to the present invention is shown in FIG. 1B as adaptive antenna array 100B. Antenna array 100B, like antenna array 100A described above, includes antenna elements 121–132 disposed in an orientation suitable for beam forming. However, unlike antenna array 100A, antenna array 100B does not provide antenna beam forming functionality. Instead, antenna array 100B provides antenna signal interfaces 101–112 which correspond to the signals as transduced by a corresponding one of antenna elements 121–132. Accordingly, by providing a plurality of signal components, having a desired phase and/or amplitude relationship, to selected ones of antenna signal interfaces 101–112, antenna beams having desired characteristics may be formed.

It should be appreciated that antenna array 100B is suited for use in providing fully adaptive beam forming by coupling antenna array 100B to a feed network adapted to controlledly provide weighting to a plurality of signal components used in forming the antenna beams. However, providing fully adaptive antenna beams, especially where a relatively large number of subscriber units will be in simultaneous communication with the system, such as in cellular telephony, generally requires substantial computing resources and/or may have significant signal processing delays associated therewith.

Accordingly, the preferred embodiment of the present invention provides systems and methods adapted to provide a hybrid beam forming/switching technique to address disadvantages associated with the use of multi-beam and adaptive arrays. Directing attention to FIG. 2, a block diagram of circuitry adapted according to the present invention is shown as system 200.

Figure 2:
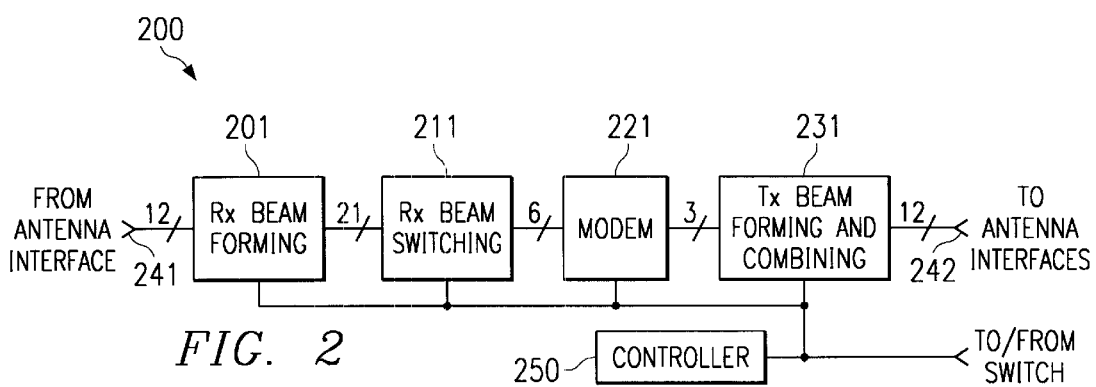
FIG. 2 shows a preferred embodiment of a system adapted according to the present invention.

As shown in FIG. 2, system 200 of the preferred embodiment includes antenna interfaces 241 (receive signal path or reverse link) and 242 (transmit signal path or forward link). It should be appreciated that antenna interfaces 241 and 242 are suitable for interfacing system 200 with antenna array 100A or 100B through antenna signal interfaces 101–112. For example, a diplexer or duplexer circuit may be coupled to each of interfaces 241 and 242 to couple both to antenna signal interfaces 101–112 of antenna array 100A. Alternatively, such diplexer or duplexer circuitry may be foregone and interfaces 241 and 242 may be coupled to individual antenna arrays, such as interface 241 being coupled to a first antenna array 100A and interface 242 being coupled to a second antenna array 100A. Of course, there is no limitation of the present invention requiring coupling to a same or similar antenna array in both the forward and reverse links. For example, interface 241 may be coupled to antenna array 100B while interface 242 is coupled to antenna array 100A. Similarly, there is no limitation of the present invention requiring coupling to an antenna array in a same or similar way in both the forward and reverse links. For example, interface 241 may be coupled to antenna array 100A through antenna signal interfaces 101–112 to utilize beam forming matrixes 141–143, whereas interface 242 is coupled to antenna array 100A at a point between the beam forming matrixes 141–143 and antenna elements 121–132 to thereby avoid use of the beam forming matrixes in the transmit signal path.

It should be appreciated that, although the above described preferred embodiments have been discussed with respect to twelve antenna element arrays having twelve antenna signal interfaces, the present invention may operate with any number of antenna elements to provide any number of antenna beams. Accordingly, the present invention is not limited to use of the embodiment shown in FIG. 2, nor to the particular number of signal paths and/or antenna beams shown therein. Moreover, the present invention is not limited to the use of panel antennas as described above. The systems and methods of the present invention may be utilized with any antenna configuration suitable for use in beam forming. For example, the present invention may be utilized with the conical antenna system of copending and commonly assigned U.S. patent application Ser. No. 09/231, 342, entitled Conical Omni-Directional Coverage Multibeam Antenna," the disclosure of which is hereby incorporated herein by reference.

The preferred embodiment system 200 shown in FIG. 2, in addition to interfaces 241 and 242 described above, includes receive beam former 201, receive beam switcher 211, modem 221, transmit beam former and combiner 231, and controller 250. In the preferred embodiment, wherein a communication network is coupled to mobile or wireless subscriber units, such as is the case in cellular telephony, a communication link is provided to the communication network, such as shown as an interface to a communication network switch.

As described above, the preferred embodiment of FIG. 2 is operable with either or both of a multi-beam array and adaptive array. However, to better aid in the understanding of the present invention, operation of system 200 will be described herein with reference to use of each such antenna array configuration separately.

When coupled to an antenna array providing antenna beam forming functionality, such as antenna array 100A, antenna beam signals are received at interface 241 and provided to receive beam former 201. The preferred embodiment shows the twelve antenna beam signals associated with antenna array 100A coupled to receive beam former 201.

As it is anticipated that the antenna beams provided by the multi-beam antenna will not always provide signals having desired characteristics, receive beam former 201 of the present invention is adapted to perform weight combining of the antenna beam signals to generate or synthesize additional antenna beams. For example, where cusping losses associated with a subscriber unit transmitting from a position located in the cusp of two adjacent antenna beams are sufficiently great, receive beam former 201 may be adapted to generate an antenna beam to satisfactorily service the area associated with the cusping loss. Additionally or alternatively, receive beam former 201 may be adapted to generate an antenna beam having a null steered toward a source of interference, such as a point to point microwave communication station located within a service area associated with system 200, in order to eliminate or mitigate interference.

The weighted combining of receive beam former 201 may be provided through the use of a number of devices well known in the art. For example, phase delays useful in weighted combining may be introduced through the use of switched lengths of transmission line, surface acoustic wave (SAW) devices, hybrid combiners, digital signal processing, and the like. Similarly, signal amplitude adjustment useful in weight combining may be provided through the use of variable attenuators, variable gain amplifiers, I and Q combiners, digital signal processors, and the like.

Control of such devices is preferably provided by operation of control processor such as controller 250, having a processor, memory, and a control algorithm operable according to the present invention. Accordingly, the preferred embodiment controller 250 is provided information with respect to the particular antenna array coupled to system 200 in order to properly control weighting of the antenna signals provided to receive beam former 201.

Figure 3:
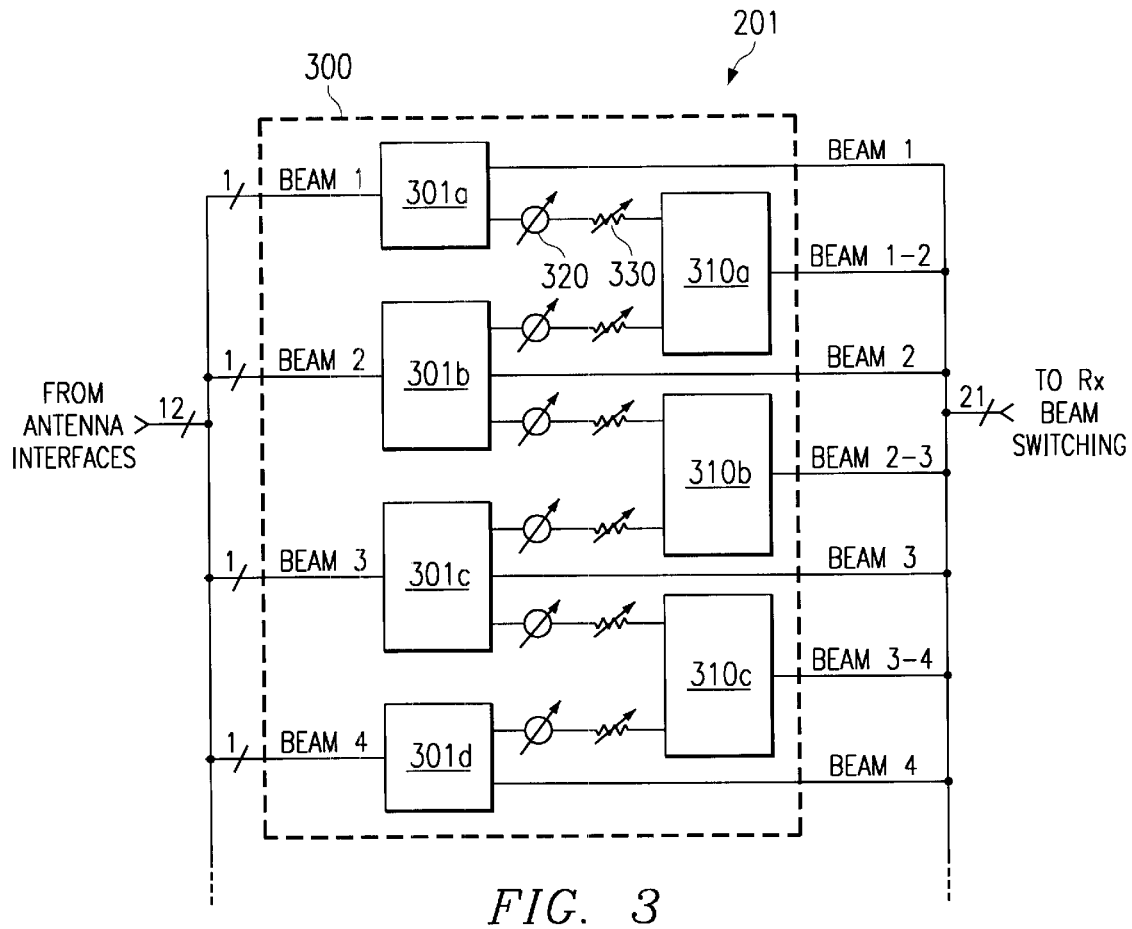
FIG. 3 shows block diagram of the functionality provided by a preferred embodiment of the receive beam former of FIG. 2.

A schematic diagram of the functionality of the above described devices, such as may be controlled by controller 250, is shown in FIG. 3 as discrete adjustable phase delay devices 320 and signal amplitude adjustment devices 330. It should be appreciated that the use of the illustrated discrete devices is not a limitation of the present invention, but rather is utilized herein to aid in the understanding of operation according to the present invention. In fact, a most preferred embodiment of the present invention utilizes digital signal processing techniques, or other general purpose circuitry, to provide selectively configurable circuitry suitable for providing desired antenna beam forming, such as may be utilized in one configuration to operate with an adaptive array antenna and in another configuration to operate with a multi-beam antenna array. Accordingly, disposed in the signal path between antenna array 100A and system 200 may be circuitry such as a bank of low noise amplifiers and analogue to digital converters, such as may be utilized to divide the receive antenna beam signals into their in-phase (I) and quadrature (Q) components. In this preferred embodiment, digital signals would be provided to receive beam former 201 for digital signal processing to provide the functionality associated with the exemplary devices described herein.

In order to provide both the antenna beam signal associated with the antenna beams of antenna array 100A and antenna beam signals generated by receive beam former 201, devices, such as splitters 301a–301d, are preferably provided in the antenna beam signal paths to provide multiple renditions of the antenna beam signals. In the preferred embodiment shown in FIG. 3, splitters 301a–301d provide a number of antenna beam signal renditions suitable for generating a desired number of additional antenna beam signals therefrom in addition to an unaltered rendition of the antenna beam signal. Accordingly, a set of phase delay device 320 and amplitude adjuster device 330 are provided for ones of the antenna beam signal renditions, allowing independent control of weighting parameters associated therewith, to provide antenna beam signal renditions suitable for use in generating various desired antenna beams. In the preferred embodiment of FIG. 3, the antenna beam signal renditions used in generating a desired antenna beam are combined, such as through the use of combiners 310a–310c, each of which is associated with a generated antenna beam signal.

Still referencing FIG. 3, it can be seen that the preferred embodiment of receive beam former 201 illustrated therein includes the functionality of the above discussed devices configured to provide supplemental antenna beam circuit 300. Supplemental antenna beam circuit 300 is adapted to accept particular antenna beam signals from the antenna array and generate desired supplemental antenna beam signals therefrom. For example, the four antenna beam signals associated with beam forming matrix 141 of FIG. 1A may each be respectively provided to splitters 301a–301d of supplemental antenna beam circuit 300 to thereby provide these four antenna beam signals and an additional three supplemental antenna beam signals therefrom. Accordingly, the three supplemental antenna beam signals generated by supplemental antenna beam circuit 300 may be adapted to provide reception of signals in a cusping area between each of the four antenna beam signals of the first antenna panel of FIG. 1A. It should be appreciated that generation of supplemental antenna beam signals corresponding to an area of convergence of antenna beams of multiple antenna panels may not be desired in some systems, as the antenna beams of different panels have different phase centers and, therefore, may not experience as significant of cusping losses as those associated with a same antenna panel.

Supplemental antenna beam circuits in addition to that shown in FIG. 3 are preferably included in receive beam former 201. For example, two additional supplemental antenna beam circuits, configured the same as supplemental antenna beam circuit 300, may be provided for processing the antenna beam signals of the remaining antenna panels. Additionally or alternatively, additional supplemental antenna beam circuits, configured different than supplemental antenna beam circuit 300, may be provided for processing the antenna beam signals to provide different supplemental antenna beam signals.

As shown in the preferred embodiments of FIGS. 2 and 3, antenna beam signals in addition to those provided by the multi-beam antenna are provided by receive beam former 201. Specifically, in the preferred embodiment of FIG. 2, the twelve antenna beam signals of antenna array 100A and nine supplemental antenna beam signals, three each associated with the antenna beam cusps of the three antenna panels, are provided. Of course, any number of antenna beams may be utilized according to the present invention. Moreover, there is no limitation that the antenna beams generated by the multi-beam antenna be passed by receive beam former 201, where such antenna beams are not desired.

Receive beam switcher 211 is utilized to selectively pass, such as under control of controller 250, ones of the antenna beam signals for further processing, such as by modem 221. For example, where it is decided that communications associated with a particular channel are best served by particular beams of the available antenna beams (as provided by the antenna beam signals and the supplemental antenna beam signals), those antenna beams may be passed to the exclusion of other ones of the antenna beams.

Preferably, the switching of the present invention is at the baseband and is based on the output from a demodulation receiver as is shown in the above referenced patent application entitled "Embedded Digital Beam Switching." For example, the demodulation receiver may continuously provide estimates of a signal interference ratio on the, typically 6 (3 sectors times 2 diversity inputs per sector), inputs that it contains to controller 250. Accordingly, receive switcher 211 and/or transmit antenna beam former and combiner 231 may be updated based on those six signal interference ratio reports.

In a preferred embodiment, modem 221 is a cell site modem adapted for three sectored communications and providing diversity receive ports for each of the three sectors (six receive ports). Accordingly, receive beam switcher 211 of FIG. 2 selectively passes six antenna beam signals (two diversity antenna beam signals for each of three sectors) to modem 221. Of course, any number of antenna beam signals deemed desirable may be passed by receive beam switcher 211. For example, where diversity signal processing is not provided for, less antenna beam signals may be passed. Additionally or alternatively, signal combining may be utilized, with or without providing de-correlation such as through delays, to pass multiple antenna beam signals for combining into a single receiver input, such as where a CDMA rake receiver is utilized.

The beam switching functionality of receive beam switcher 211 may be provided by a number of devices. For example, devices such as discrete switching circuits, switch matrixes, signal attenuation devices, digital signal processing devices, and the like may be utilized to controllably allow selected antenna beam signals to pass. Accordingly, it should be appreciated that, although receive beam former 201 and receive beam switcher 211 are illustrated as separate components, the functionality of both may be provided by a common circuit. In fact, in the most preferred embodiment, common digital signal processing circuitry is utilized in providing the above described functionality of receiver beam former 201 and receive beam switcher 211.

In the preferred embodiment, modem 221, or any appropriate signal processing circuitry, accepts the received signals for processing operations of the desired communications and provides transmit signals for communication to subscriber units. For example, in a preferred embodiment system 200 is utilized for providing communications between a plurality of subscriber units, such as mobile wireless cellular telephones, and a communication network, such as a public switched telephone network (PSTN). Accordingly, modem 221 of FIG. 2 is coupled to the network, such as through a central office switch or mobile switching office, for processing of received voice and/or data signals and transmission of corresponding voice and/or data signals.

The preferred embodiment of system 200 shown in FIG. 2 includes transmit beam former and combiner 231. In the preferred embodiment, where modem 221 is a cell site modem adapted for three sectored communications, modem 221 provides transmit ports for each of three sectors (three transmit ports). Accordingly, transmit beam former and combiner 231 of the preferred embodiment of FIG. 2 accepts three signals (one antenna beam signal for each of three sectors) from modem 221 for provision to the antenna beam interfaces of the antenna array according to the present invention. Of course, any number of signals deemed desirable may be accepted by transmit beam former and combiner 231. For example, where diversity signal processing is provided for in the forward link, more signals may be accepted for coupling to the antenna array according to the present invention.

As it is anticipated that the antenna beams provided by the multi-beam antenna will not always provide signals having desired characteristics, transmit beam former and combiner 231 of the present invention is adapted to perform weighted combining of the transmit signals to generate or synthesize additional or alternative antenna beams. For example, where cusping losses associated with a subscriber unit receiving signals at a position located in the cusp of two adjacent antenna beams are sufficiently great, transmit beam former and combiner 231 may be adapted to generate an antenna beam to satisfactorily service the area associated with the cusping loss. Additionally or alternatively, transmit beam former and combiner 231 may be adapted to generate an antenna beam having a null steered toward a particular area, such as the location of another subscriber unit operating within a channel associated with a different antenna beam, in order to eliminate or mitigate interference.

The weighted combining of transmit beam former and combiner 231 may be provided through the use of a number of devices well known in the art such as those described above with respect to receive beam former 201. Likewise, control of such devices is preferably provided by operation of control processor such as controller 250, as is described above with respect to receive beam former 201. Accordingly, the preferred embodiment controller 250 is provided information with respect to the particular antenna array coupled to system 200 in order to properly control weighting of the antenna signals provided to transmit beam former and combiner 231.

Figure 4:
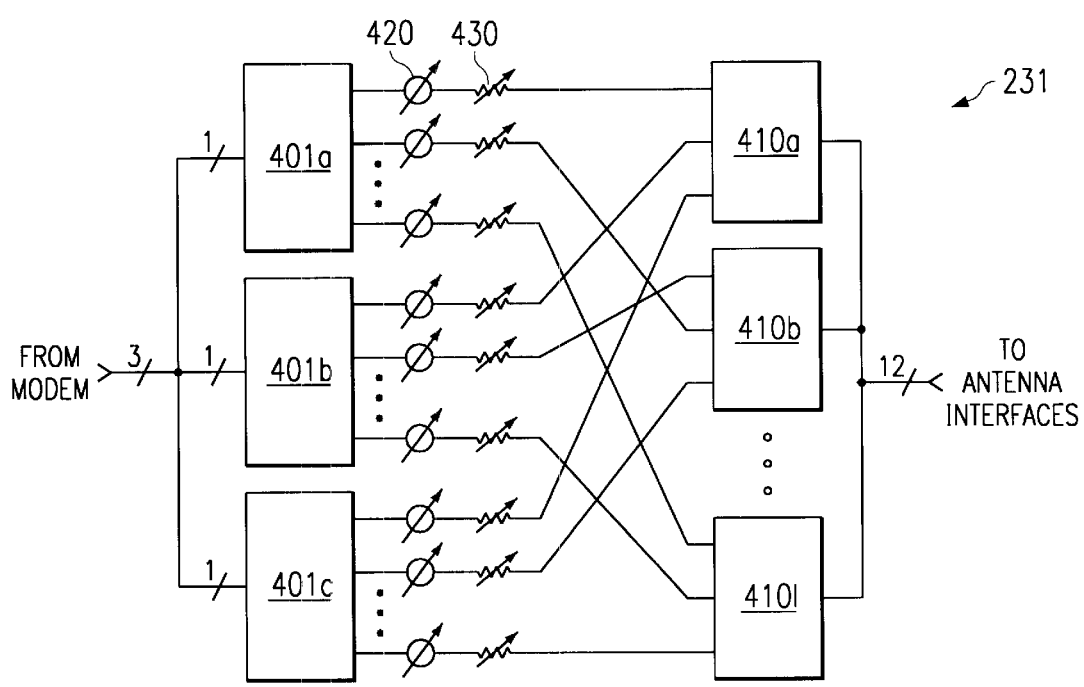
FIG. 4 shows a block diagram of the functionality provided by a preferred embodiment of the transmit beam former and combiner of FIG. 2.

A schematic diagram of the functionality of the above described devices is shown in FIG. 4 as discrete adjustable phase delay devices 420 and signal amplitude adjustment devices 430. As with receive beam former 201 described above, the use of discrete devices is not a limitation of the present invention, but rather is utilized herein to aid in the understanding of operation according to the present invention. A most preferred embodiment of the present invention utilizes digital signal processing techniques, or other general purpose circuitry, to provide selectively configurable circuitry suitable for providing desired antenna beam forming, such as may be utilized in one configuration to operate with an adaptive array antenna and in another configuration to operate with a multi-beam antenna array. Accordingly, disposed in the signal path between antenna array system 200 and antenna array 100A may be circuitry such as a bank of linear power amplifiers and digital to analogue converters, such as may be utilized to combine the transmit I and Q signal components into transmit antenna beam signals. In this preferred embodiment, digital signals would be provided to transmit beam former and combiner 231 for digital signal processing to provide the functionality associated with the exemplary devices described herein.

It should be appreciated that, in order to provide for the transmission of the transmit signals, such as provided by modem 221, within selected or selectable areas of a service area associated with system 200, devices, such as splitters 401a–401c, are preferably provided in the antenna beam signal paths to provide multiple renditions of the antenna beam signals. In the preferred embodiment shown in FIG. 4, splitters 401a–401c provide a number of antenna beam signal renditions suitable for coupling each antenna beam signal with a desired number of antenna array interfaces. In the preferred embodiment of FIG. 4, each antenna beam signal provided by modem 221 is divided into twelve renditions for provision to each of the twelve antenna interfaces of antenna array 100A. The ability to provide each of the antenna beam signals to any of the antenna array interfaces allows complete freedom in generating or synthesizing transmit antenna beam patterns. Of course, where such an ability is not necessary or desired, such as where particular antenna beam signals are to be limited to within a particular region of the service area, ones of the antenna beam signal may be divided into a number of antenna beam signal renditions suitable for coupling only to those antenna array interfaces desired.

Preferably, a set of phase delay device 420 and amplitude adjuster device 430 is provided for the antenna beam signal renditions, allowing independent control of weighting factors associated therewith, to provide antenna beam signal renditions suitable for use in generating various desired transmit antenna beams. In the preferred embodiment of FIG. 4, the antenna beam signal renditions used in generating a desired antenna beam are combined, such as through the use of combiners 410a–410l, each of which is associated with an antenna array interface.

It should be appreciated that the circuitry of the transmit path and the reverse path may be substantially the same or different according to the present invention. Accordingly, the preferred embodiment described above provides a transmit side signal path that does not include beam switching, although the receive side does. Beam switching in the transmit signal path may be omitted in the transmit path of this preferred embodiment for reasons such as operation of the system may allow more time for beam forming weighting calculations in the forward link, such as due to the increased transmit power level, and/or the need for more complex beam forming such as for control channels. Of course, the beam switching described above with respect to the reverse link may be utilized in the forward link, if desired.

It should be appreciated that, although antenna array 100A provides beam forming functionality, by utilizing information with respect to the beam forming performed by antenna array 100A transmit beam former and combiner 231 may be operated to control the complex weighting of signals provided to the beam formers of antenna array 100A and thereby control aspects, such as size, shape, and direction, of the antenna beams actually formed. Accordingly, operation of the present invention provides a means by which antenna beams having desired characteristics may be formed in the forward link. For example, where a subscriber unit is receiving at a position located in the cusp of two adjacent antenna beams normally formed by the beam formers of antenna 100A, transmit beam former and combiner 231 may be controlled to generate an antenna beam to satisfactorily service the area associated with the cusping loss.

Having described above operation of a preferred embodiment of the present invention with a multi-beam antenna array, such as antenna array 100A of FIG. 1A, a description of operation of a preferred embodiment of the present invention with an adaptive array antenna, such as antenna array 100B of FIG. 1B, is provided below. The most preferred embodiment of the present invention is adapted for use with either a fixed antenna beam array, an adaptive array, or a combination thereof. Accordingly, the description of the preferred embodiment operation with an adaptive array antenna will again reference system 200 of FIG. 2.

In operation with an adaptive array antenna, such as antenna array 100B, receive beam former 201 of the preferred embodiment provides antenna signal weighting and combining to generate any desired antenna beam signals from antenna signals provided by the antenna array. The weight combining of receive beam former 201, as described above, may be provided through the use of a number of devices well known in the art. Also as described above, control of such devices is preferably provided by operation of controller 250. Accordingly, the preferred embodiment controller 250 is provided information with respect to the particular antenna array coupled to system 200 in order to properly control weighting of the antenna signals provided to receive beam former 201.

Receive beam former 201 preferably performs the beam forming functionality in the receive signal path that is provided by the combination of beam formers in the multi-beam antenna and receive beam former 201 in the embodiment described above. Accordingly, controller 250 is preferably provided information with respect to the antenna array coupled to system 200 in order to properly control receive beam former 201 in forming desired antenna beam signals.

It should be appreciated that, although receive beam former 201 may be utilized to generate a preselected number of antenna beam signals which are then selectively passed by receive beam switcher 211, as described above with respect to use of the multi-beam antenna, a preferred embodiment of the present invention operates to generate the antenna beam signals actually to be utilized. Accordingly, receive beam switcher 211 may simply operate to pass those antenna beam signals generated by receive beam former 201. Of course, where the preferred embodiment digital signal processing is utilized to provide the functionality of receive beam former 201 and receive beam switcher 211, the functionality of receive beam former 201 and receive beam switcher 211 may be merged into a common operation, wherein the weighting characteristics of only the desired antenna beam signals are applied to the antenna signals for forming antenna beam signals.

As discussed above, the beam switching functionality of receive beam switcher 211 may be provided by a number of devices known in the art. Also as described above, control of receive beam switcher 211 may be provided by controller 250. For example, devices such as discrete switching circuits, switch matrixes, signal attenuation devices, digital signal processing devices, and the like may be utilized to controllably allow selected antenna beam signals to pass. Accordingly, it should be appreciated that, although receive beam former 201 and receive beam switcher 211 are illustrated as separate components, the functionality of both may be provided by a common circuit. In fact, in the most preferred embodiment, common digital signal processing circuitry is utilized in providing the above described functionality of receiver beam former 201 and receive beam switcher 211.

The signals passed by receive beam switcher 211 are utilized for communication processing, such as by modem 221, as described above. Likewise, the preferred embodiment communication processing circuitry, such as modem 221, provides transmit signals for communication to subscriber units. As discussed above, these transmit signals are preferably provided to transmit beam former and combiner 231.

Transmit beam former and combiner 231 performs weight combining of the transmit signals to generate or synthesize desired antenna beams. For example, an antenna beam illuminating an area associated with a subscriber unit receiving signals of the present invention may be generated by transmit beam former and combiner 231. Additionally or alternatively, transmit beam former and combiner 231 may be adapted to generate an antenna beam having a null steered toward a particular area, such as the location of another subscriber unit operating within a channel associated with a different antenna beam, in order to eliminate or mitigate interference.

It should be appreciated that providing complex weighting information for fully adaptive antenna beam forming may require considerable resources be at the disposal of controller 250 and/or receive beam former 201 and transmit beam former and combiner 231. Accordingly, a preferred embodiment of the present invention utilizes a hybrid adaptive technique wherein predetermined sets of weighting parameters are utilized to define particular desired, and preferably commonly used, antenna beams. Accordingly, in operation in either of the above described embodiments utilizing beam forming with either a multi-beam antenna array or an adaptive array antenna, predefined sets of weighting parameters may be utilized to rapidly form desired antenna beams.

Of course, additional weighting parameters may be dynamically determined, such as through operation of controller 250, useful with or in place of the predefined sets of weighting parameters. For example, controller 250 may operate to determine a set of weighting parameters to supplement the predefined sets when a receive or transmit signal attribute does not meet a desired threshold.

Additionally or alternatively, controller 250 may operate to determine a set of weighting parameters to replace a particular predefined set when a receive or transmit signal attribute does not meet a desired threshold. For example, statistical determinations may be made, such as by controller 250 based upon historical and/or monitored communication characteristics, which indicate that a particular predefined set of weighting parameters consistently does not produce receive or transmit signals having desired characteristics. Accordingly, this set of weighting parameters may be replaced by another set to provide an antenna beam statistically improved. Replacement of sets of weighting parameters may be heuristic, based on predictions, or a combination of the two.

Utilizing the above described sets of weighting parameters in beam forming, the present invention may be utilized to provide hybrid beam switching, wherein a multi-beam antenna array is utilized in combination with predefined supplemental adaptively formed antenna beams, and/or hybrid adaptive beam forming, wherein an adaptive array antenna is utilized in combination with predefined adaptively formed antenna beams. Of course, fully adaptive techniques may be utilized in combination with or in place of the hybrid predefined adaptive antenna beams described above, if desired.

In operation of a preferred embodiment wherein antenna beams in both a forward and reverse link are served, such as in the embodiment of system 200 of FIG. 2, updating of the receive antenna beams and the transmit antenna beams may be accomplished at the same or different rates. For example, in a system utilizing time division duplexing (TDD), it may be desired to utilize a same receive and transmit pattern in conducting communications with a subscriber unit, such as may be accomplished by selecting transmit antenna beams based upon the receive antenna beams utilized for a particular subscriber unit. Accordingly, in such a system updating of the transmit antenna beams and receive antenna beams may be at substantially the same rate.

Alternatively, updating of transmit antenna beams and receive antenna beams may be substantially independent of one another. For example, in a system utilizing frequency division duplexing (FDD), it may be desired to update one link's (forward or reverse link) antenna beams more frequently than the other link's (forward or reverse link) antenna beams because of differences there between, such as differences in fading on the two radio frequency (RF) channels or differences in the power levels of signals in the two links. Similarly, in a system providing receive signal information from a subscriber unit, such as is performed in third generation CDMA (3GCDMA) cellular telephony, the transmit antenna beams may be updated based upon received signal information provided from subscriber units whereas the receive antenna beams may be updated based upon received signal information provided by system 200.

It should be appreciated that the present invention may be scaled to operate in a number of situations. For example, where a plurality of voice channels are to be simultaneously serviced, the circuitry of FIG. 2 may be scaled to provide communication of these voice channels.

Figure 5:
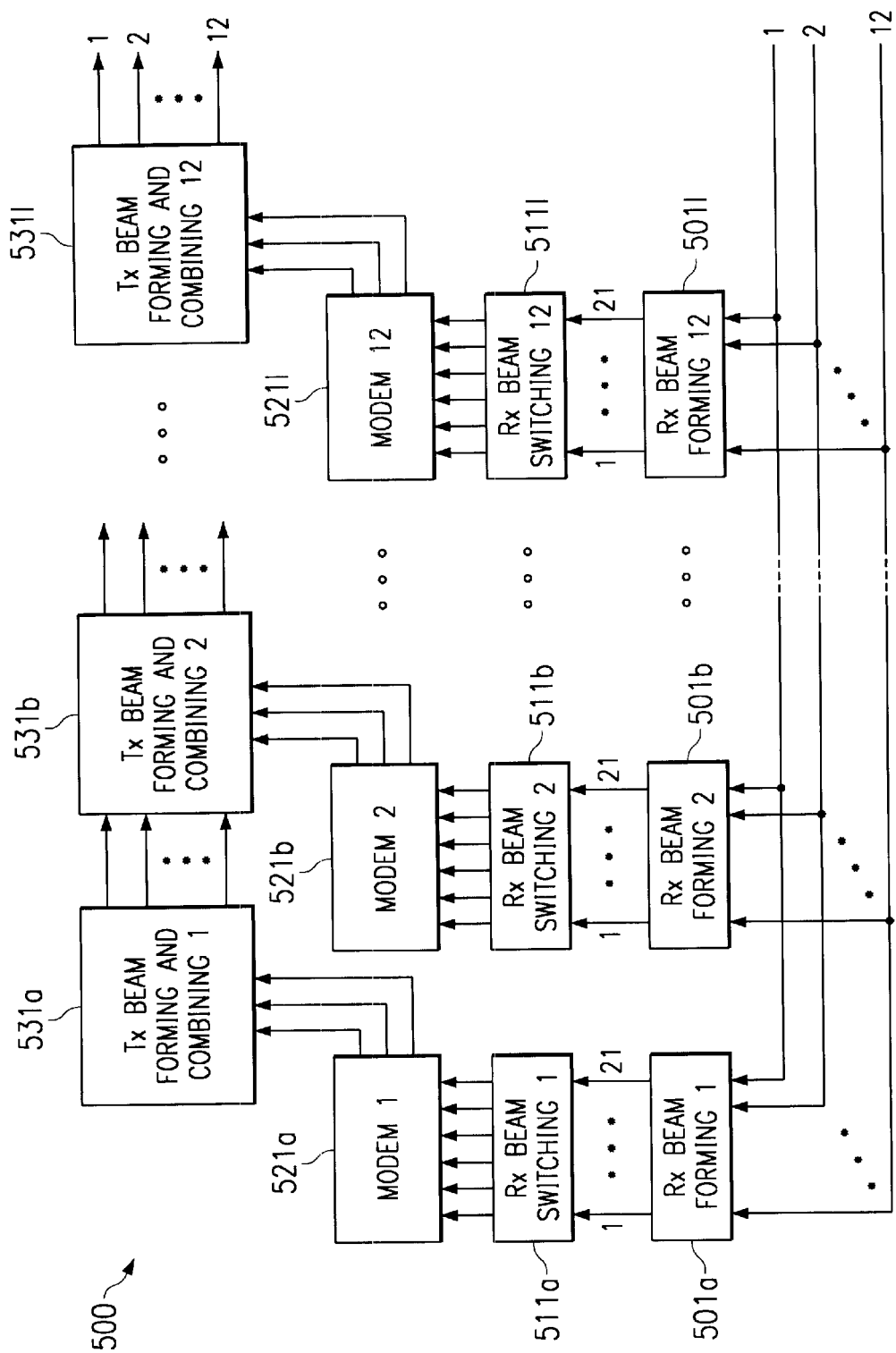
FIG. 5 shows the scaleability of the system of FIG. 2.

Directing attention to FIG. 5, system 500 provides circuitry corresponding to that of FIG. 2 to accommodate additional channels. Specifically, like the preferred embodiment of FIG. 2, system 500 of FIG. 5 includes receive beam former 501, receive beam switcher 511, modem 521, and transmit beam former 531. However, it should be appreciated that system 500 includes scaling of this circuitry to accommodate a plurality of channels, i.e., receive beam former 501 comprises receive beam former 501a–501l, receive beam switcher 511 comprises receive beam switcher 511a–511l, modem 521 comprises modem 511a–511l, and transmit beam former and combiner 531 comprises transmit beam former and combiner 531a–531l.

The inter-connection of components to provide cascading as shown in FIG. 5 is not limited to use with the transmit beam forming and combining circuitry. For example, the modems may be interconnected in a cascade to accept signals of another channel for processing as a common antenna beam signal.

It should be appreciated that inter-connection of components as described above with respect to FIG. 5 is not a limitation of the present invention. For example, each channel may be processed separately according to the present invention and combined for provision to the antenna array using a complex matrix component. However, the preferred embodiment utilizes the above cascade inter-connection to distribute the summing computation load across the components.

It should be appreciated that the concepts of the present invention may be applied to either a forward link or a reverse link without being applied to a corresponding reciprocal link. For example, system 200 of FIG. 2 may be adapted to eliminate the circuitry shown associated with the transmit signal path to provide a receive only system, if desired.

Additionally, it should be appreciated that, although a preferred embodiment has been described herein with reference to CDMA communication signals, the present invention is not limited to the use of CDMA communication signals. The systems and methods of the present invention are useful with any number of communication techniques and protocols, including TDMA and GSM protocols common to cellular telephony.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A wireless communication system comprising:
   an antenna array having a plurality of signal transducers disposed in a predetermined relationship;
   a signal processing device;
   a controllable signal path coupling said antenna array to said signal processing device, wherein said controllable signal path provides weighting of signal components communicated between said antenna array and said signal processing device to thereby provide antenna beam forming, wherein said controllable signal path utilizes at least one set of a plurality of predetermined sets of weighting components each associated with an antenna beam predetermined to provide desired communication characteristics using said antenna array; and a controller coupled to said controllable signal path, wherein said controller monitors at least one attribute of communications provided by said system, wherein said controller selectively provides said controllable signal path with said at least one set of weighting components in response to said at least one monitored communication attribute, wherein said controller dynamically determines at least one set of weighting components in addition to said plurality of predetermined sets of weighting components in response to said at least one monitored communication attribute, wherein said additional set of weighting components is utilized to define an antenna beam supplemental to the predetermined antenna beams associated with the plurality of sets of weighting components.

2. The system of claim 1, wherein said controllable signal path comprises:

a forward link controllable signal path portion; and a reverse link controllable signal path portion.

3. The system of claim 2, wherein each of said forward link controllable signal path portion and said reverse link controllable signal path portion is provided a different interface with said antenna array.

4. The system of claim 3, wherein said antenna array interface associated with one of said forward link controllable signal path portion and said reverse link controllable signal path portion is associated with a beam forming matrix and said antenna array interface associated with the other one of said forward link controllable signal path portion and said reverse link controllable signal path portion is not associated with a beam forming matrix.

5. The system of claim 3, wherein said antenna array interface associated with said forward link controllable signal path portion is coupled to a first portion of said antenna array, and wherein said antenna array interface associated with said reverse link controllable signal path portion is coupled to a second portion of said antenna array.

6. The system of claim 1, wherein said at least one monitored communication attribute is an estimate of a signal interference ratio.

7. The system of claim 1, wherein said controller comprises:

statistical analysis circuitry, wherein said additional set of weighting components is utilized to replace a set of weighting components of said predetermined set of weighting components statistically determined to be undesirable.

8. The system of claim 1, wherein said controllable signal path is operable with both a multi-beam antenna array and an adaptive array antenna, and wherein said controller is provided information with respect to said antenna array coupled to said controllable signal path for use in determining a proper set of weighting components for use therewith.

9. The system of claim 1, wherein said antenna array is a multi-beam array having beam forming functionality associated therewith.

10. The system of claim 9, wherein ones of said sets of weighting components are associated with an antenna beam predetermined to provide communications within a cusping area between antenna beams provided by said beam forming functionality of said multi-beam array, thereby providing cusp antenna beams.

11. The system of claim 10, wherein said cusp antenna beams are formed by said controllable signal path utilizing weighting components applied to signals associated with said antenna beams provided by said beam forming functionality of said multi-beam array.

12. The system of claim 9, wherein said multi-beam array comprises:

a multi-beam panel antenna.

13. The system of claim 9, wherein said multi-beam array comprises:

a conical multi-beam antenna.

14. The system of claim 1, wherein said signal processing device is a modem.

15. The system of claim 14, wherein said modem is coupled to a network to provide communication between a wireless subscriber unit and said network.

16. The system of claim 14, wherein said modem is a cell site modem having three sector interfaces.

17. The system of claim 16, wherein said controllable signal path comprises:

a reverse link signal path operable to provide six antenna beam signals to said cell site modem sector interfaces.

18. The system of claim 16, wherein said controllable signal path comprises:

a forward link signal path operable to accept three signals from said cell site modem sector interfaces and provide beam forming operations thereon.

19. A method for providing wireless communications comprising the steps of:

determining a plurality of sets of weighting components useful in forming antenna beams predetermined to be desirable in conducting a substantial number of communications;

utilizing ones of said predetermined sets of weighting components in providing wireless communications;

monitoring at least one attribute of said wireless communications;

determining at least one set of weighting components useful in forming an antenna beam to supplement said predetermined antenna beams at least in part with reference to information obtained from said monitoring step; and utilizing said at least one set of weighting components in providing wireless communications to improve said at least one attribute monitored in said monitoring step.

20. The method of claim 19, further comprising the steps of:

selecting an antenna array to utilize in conducting communications, wherein said antenna array is selected from the group consisting of multi-beam arrays and adaptive array antennas; and providing information with respect to said selected antenna to control circuitry operable to determine said at least one set of weighting components.

21. The method of claim 19, wherein said step of determining a plurality of sets of weighting components comprises the steps of:

determining an undesired aspect associated with the use of antenna beams of a multi-beam antenna; and determining antenna beam configurations suitable for redressing said undesired aspect, wherein ones of said predetermined antenna beams include said determined antenna beam configurations.

22. The method of claim 21, wherein said undesired aspect associated with the use of antenna beams of a multi-beam antenna is a cusp between antenna beams of said multi-beam antenna.

23. A system for providing antenna beam forming comprising:
   a multi-beam antenna array having a plurality of antenna interfaces associated with a plurality of predetermined primary antenna beams of said multi-beam antenna array; and
   a first beam former circuit coupled to ones of said plurality of antenna interfaces, wherein said first beam former utilizes signal weighting component information with primary antenna beam signals associated with said plurality of primary antenna beams to thereby provide a first plurality of supplemental antenna beams in addition to said plurality of primary antenna beams.

24. The system of claim 23, further comprising:
   a beam selector circuit coupled to said first beam former circuit, wherein said beam selector circuit operates to select ones of said plurality of primary antenna beams and ones of said first plurality of supplemental antenna beams for use in providing communications.

25. The system of claim 24, wherein said first beam former circuit comprises:
   means for splitting antenna beam signals of said plurality of primary antenna beams to thereby provide antenna beam signal components;
   means for adjusting a phase relationship of ones of said antenna beam signal components according to said signal weighting component information to thereby provide phase adjusted antenna beam signal components; and
   means for combining ones of said phase adjusted antenna beam signal components to provide supplemental antenna beam signals associated with said first plurality of supplemental antenna beams.

26. The system of claim 24, further comprising:
   a second beam former circuit coupled to ones of said plurality of antenna interfaces, wherein said second beam former utilizes signal weighting component information with primary antenna beam signals associated with said plurality of primary antenna beams to thereby provide a second plurality of supplemental antenna beams.

27. The system of claim 26, wherein said first beam former circuit is disposed in a receive signal path and said second beam former circuit is disposed in a transmit signal path.

28. The system of claim 27, wherein said second beam former circuit comprises:
   means for splitting transmit signals provided to said second beam former circuit to thereby provide transmit signal components;
   means for adjusting a phase relationships of ones of said transmit signal components according to said signal weighting component information to thereby provide phase adjusted transmit signal components; and
   means for combining ones of said phase adjusted transmit signal components to provide supplemental antenna beam signals associated with said second plurality of supplemental antenna beams.

29. The system of claim 26, wherein control of formation of said first plurality of supplemental antenna beams is independent of control of formation of said second plurality of supplemental antenna beams.

30. The system of claim 23, wherein said signal weighting component information includes sets of signal weighting component information associated with predetermined supplemental antenna beams of said first plurality of supplemental antenna beams determined to redress disadvantages associated with said plurality of primary antenna beams.

31. The system of claim 30, wherein said predetermined supplemental antenna beams provide communication within cusping areas between ones of said plurality of primary antenna beams.

32. The system of claim 23, further comprising:
   a controller providing signal weighting component information to said first beam former circuit.

33. The system of claim 32, wherein said controller comprises:
   sets of signal weighting component information associated with predetermined supplemental antenna beams determined to redress disadvantages associated with said plurality of primary antenna beams; and
   circuitry dynamically determining sets of signal weighting component information based on monitored communication attributes to define supplemental antenna beams of said first plurality of supplemental antenna beams in addition to said predetermined supplemental antenna beams.

34. The system of claim 23, wherein said multi-beam antenna comprises:
   a beam forming matrix coupled to antenna elements of said multi-beam antenna, wherein ones of said antenna interfaces are associated with interfaces of said beam forming matrix.

35. The system of claim 34, wherein said beam forming matrix is a Butler matrix.

36. The system of claim 34, wherein said multi-beam antenna array comprises:
   a plurality of multi-beam antenna panels, wherein said beam forming matrix is associated with a multi-beam antenna panel of said plurality of multi-beam antenna panels.

37. The system of claim 34, wherein said antenna elements of said multi-beam antenna array are disposed in a circular arrangement.

38. A method for providing antenna beam forming comprising the steps of:
   deploying a multi-beam antenna array having a plurality of antenna interfaces associated with a plurality of predetermined primary antenna beams of said multi-beam antenna array;
   determining a plurality of sets of weighting components useful in forming a plurality of supplemental antenna beams suitable for redressing an undesired aspect associated with said plurality of primary antenna beams; and
   operating a first beam former coupled to ones of said plurality of antenna interfaces to form said plurality of supplemental antenna beams utilizing sets of weighting components of said plurality of sets.

39. The method of claim 38, further comprising the step of:
   selecting an antenna beam subset to utilize in conducting communications, wherein said antenna beam subset is selected from said plurality of primary antenna beams and said plurality of supplemental antenna beams.

40. The method of claim 39, wherein said selecting step comprises the steps of:
   monitoring a signal associated with each antenna beam of said plurality of primary antenna beams and said plurality of supplemental antenna beams; and selecting ones of said plurality of primary antenna beams and said plurality of supplemental antenna beams having a most desired characteristic.

41. The method of claim 40, wherein said most desired characteristic is a lowest estimate of a signal interference ratio.

42. The method of claim 38, further comprising the steps of:
   monitoring at least one attribute of wireless communications conducted using ones of said plurality of primary antenna beams and said plurality of supplemental antenna beams;
   determining at least one set of weighting components useful in forming an antenna beam to further supplement said predetermined antenna beams at least in part with reference to information obtained from said monitoring step; and
   utilizing said at least one set of weighting components in providing wireless communications to improve said at least one attribute monitored in said monitoring step.

43. A system for providing antenna beam forming comprising:
   an adaptive array antenna having a plurality of antenna interfaces;
   a first beam former circuit coupled to ones of said plurality of antenna interfaces, wherein said first beam former utilizes predetermined sets of signal weighting component information with signals of said plurality of interfaces to thereby provide a plurality of predetermined antenna beams, and wherein said first beam former utilizes dynamically determined sets of signal weighting component information with signals of said plurality of interfaces to thereby provide a plurality of dynamically determined antenna beams; and
   a beam selector circuit coupled to said first beam former circuit, wherein said beam selector circuit operates to select ones of said predetermined antenna beams and ones of said plurality of dynamically determined antenna beams for use in providing communications.

44. The system of claim 43, further comprising:
   a second beam former circuit coupled to ones of said plurality of antenna interfaces, wherein said second beam former utilizes predetermined sets of signal weighting component information with signals of said plurality of interfaces to thereby provide a plurality of predetermined antenna beams, and wherein said second beam former utilizes dynamically determined sets of signal weighting component information with signals of said plurality of interfaces to thereby provide a plurality of dynamically determined antenna beams.

45. The system of claim 44, wherein said first beam former circuit is disposed in a receive signal path and said second beam former circuit is disposed in a transmit signal path.

46. The system of claim 43, wherein said predetermined antenna beams provide communication within a plurality of substantially equal regions of a service area.

47. The system of claim 46, wherein said dynamically determined antenna beams are determined to redress disadvantages associated with said predetermined antenna beams.

48. The system of claim 47, wherein a disadvantage associated with said predetermined antenna beams redressed by at least one dynamically determined antenna beam is service of a cusp between ones of said predetermined antenna beams.

49. The system of claim 47, wherein a disadvantage associated with said predetermined antenna beams redressed by at least one dynamically determined antenna beam is an interference source disposed in at least one of said predetermined antenna beams.

50. The system of claim 43, further comprising:
   a controller providing signal weighting component information to said first beam former circuit.

51. A wireless communication system comprising:
   an antenna array having a plurality of signal transducers disposed in a predetermined relationship;
   a signal processing device; and
   a controllable signal path coupling said antenna array to said signal processing device, wherein said controllable signal path provides weighting of signal components communicated between said antenna array and said signal processing device to thereby provide antenna beam forming, wherein said controllable signal path utilizes at least one set of a plurality of predetermined sets of weighting components each associated with an antenna beam predetermined to provide desired communication characteristics using said antenna array, wherein said controllable signal path comprises a forward link controllable signal path portion and a reverse link controllable signal path portion, wherein each of said forward link controllable signal path portion and said reverse link controllable signal path portion is provided a different interface with said antenna array, and wherein said antenna array interface associated with one of said forward link controllable signal path portion and said reverse link controllable signal path portion is associated with a beam forming matrix and said antenna array interface associated with the other one of said forward link controllable signal path portion and said reverse link controllable signal path portion is not associated with a beam forming matrix.

* * * * *